(12) United States Patent
Ramsey

(10) Patent No.: US 7,464,948 B2
(45) Date of Patent: Dec. 16, 2008

(54) DISTRIBUTED COMPLIANCE AXLE/SUSPENSION SYSTEM

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 107 days.

(21) Appl. No.: 10/940,048

(22) Filed: Sep. 14, 2004

(65) Prior Publication Data

US 2005/0057014 A1  Mar. 17, 2005

Related U.S. Application Data

(60) Provisional application No. 60/504,591, filed on Sep. 17, 2003.

(51) Int. Cl.
*B60G 21/05* (2006.01)
*B60G 9/02* (2006.01)

(52) U.S. Cl. .................. 280/124.107; 280/124.157; 280/124.116; 280/124.128

(58) Field of Classification Search .......... 280/124.116, 280/124.128, 124.106, 124.107, 124.153, 280/124.157, 124.162, 124.166
See application file for complete search history.

(56) References Cited

U.S. PATENT DOCUMENTS 5,324,073 A * 6/1994 Alatalo et al. ......... 280/124.116
6,152,468 A * 11/2000 Glaser et al. .......... 280/124.134
6,543,857 B1   4/2003 Griffiths et al.
6,550,869 B2 * 4/2003 Dantele .................... 301/124.1
6,616,157 B2 * 9/2003 Christophliemke et al. ...... 280/124.106
2004/0256829 A1 * 12/2004 Chalin et al. ........... 280/124.116

FOREIGN PATENT DOCUMENTS

DE   0916530 A2 * 10/1998
EP   0243191 A1   10/1987
EP   0266546 A1   5/1988
JP   2001-88525 A * 4/2001

* cited by examiner

*Primary Examiner*—Ruth Ilan
(74) *Attorney, Agent, or Firm*—Krugliak, Wilkins, Griffiths & Dougherty Co., L.P.A.; David P. Dureska; Edward T. Kennedy

(57) ABSTRACT

A distributed compliance air-ride axle/suspension system includes an integral structure preferably formed of a lightweight composite material, replacing traditional beams and an axle. The composite structure includes a plurality of plates of various sizes and shapes, with the size, shape and arrangement of the plates being determined by the load capacity model of a specific vehicle application. Traditional axle spindle ends are mounted on the integral plate structure, together with pivot bushings, air springs, and shock absorbers, to complete the air-ride axle/suspension system. The system in turn is pivotally mounted on frame brackets of a heavy-duty vehicle such as a semi-trailer or dump truck. Forces, loads and/or stresses imposed on the axle/suspension system during vehicle operation are distributed generally throughout the composite structure to achieve the desired structural roll compliance of the axle/suspension system for the particular application.

31 Claims, 11 Drawing Sheets

DISTRIBUTED COMPLIANCE AXLE/SUSPENSION SYSTEM

CROSS-REFERENCE TO RELATED APPLICATION

This application claims the benefit of U.S. Provisional Application Ser. No. 60/504,591, filed Sep. 17, 2003.

BACKGROUND OF THE INVENTION

1. Field of the Invention

The invention relates to the art of axle/suspension systems for wheeled vehicles. More particularly, the invention is directed to the art of leading and trailing arm axle/suspension systems of heavy-duty vehicles, such as tractor-trailers or semi-trailers, which cushion the vehicle ride for occupants and cargo and stabilize the vehicle during operation.

2. Background Art

Heavy-duty vehicles, such as tractor-trailers or semi-trailers and dump trucks, typically include one or more suspension systems that connect the frame of the vehicle to the wheel-bearing axles of the vehicle. These suspension systems serve several purposes. Specifically, as a vehicle is traveling over-the-road, the wheels encounter various conditions which cause various forces, loads and/or stresses to be imposed on the axle and in turn the suspension assemblies which support the axle. These include impacts caused by vertical movement as well as roll or sway, which are associated at least in part with the suspension system. More particularly, while it is desirable for a suspension system to provide a cushioned, soft ride through means such as an air suspension, the system also must be designed to control the amount of sway imposed on the vehicle, and also stabilize the vehicle, such as by including a fairly rigid suspension structure. However, in order to prevent failure of the components of the system because of an overly rigid structure and to provide some tolerance for single-wheel impacts and the like, this rigidity must be offset or tempered by some degree of roll compliance in the suspension system.

Prior art leading or trailing arm axle/suspension systems include air suspension systems, which typically include air springs for cushioning and shock absorbers for dampening. More particularly, the air springs and shock absorbers cushion the impact on the vehicle frame that is caused by vertical movement as the vehicle travels over-the-road and encounters changes in road height, such as pot holes, bumps, etc. The axle of the leading or trailing arm axle/suspension system acts as a very large anti-sway bar to help control rolling movements of the vehicle as it travels over-the-road, and rubber pivot bushings are utilized to connect the suspension beams to the vehicle frame and are softer in the vertical direction than in the fore-aft horizontal direction. Such TRI-FUNCTIONAL® bushings, as they are known in the art and which is a registered trademark of The Boler Company, the assignee of the present invention, exhibit compliance so that a certain degree of roll can be maintained, while the other components of the suspension assemblies remain relatively rigid and non-compliant.

Another type of leading or trailing arm axle/suspension system is commonly referred to in the art as a "two pin axle connection" air suspension system. These axle/suspension systems include rigid trailing arm beam weldments that bolt onto axle seats via a pair of pins, which in turn are welded to the axle. To achieve roll compliance in the structure, the two pin axle connection systems utilize rubber bushings in the axle seats, as well as in the pivot joints that connect the trailing arms to the vehicle frame.

Still another leading or trailing arm axle/suspension system is a spring beam-type air axle/suspension system, which includes trailing arms that are very stiff and thick leaf springs that are rigidly attached to the axle and are pivotally mounted to the vehicle frame. The leaf springs provide the roll compliance for the system.

However, while all of the above-described axle/suspension systems of the prior art achieve their desired result of cushioning the vehicle ride and stabilizing the vehicle, they each involve multiple specialized components that increase manufacturing costs and contribute to increased weight of the vehicle, which in turn adversely affects the fuel efficiency of the vehicle. Moreover, the components typically used in such prior art systems include components which require frequent repair or replacement.

The above-described problems of prior art axle/suspension systems are solved by the present invention through the use of an integrally formed composite structure which replaces traditional suspension beams and axles with a composite plate structure that exhibits roll compliance throughout the entire structure, rather than through just one or two discrete components such as the TRI-FUNCTIONAL® bushings, the axle seat bushings of the two-pin suspension system, and the monoleaf springs of the spring beam-type suspension systems.

BRIEF SUMMARY OF THE INVENTION

Objectives of the present invention include providing an axle/suspension system for wheeled vehicles, which exhibits roll compliance generally throughout its entire structure during operation of the vehicle to which it is attached.

Another objective of the present invention is to provide such a distributed compliance axle/suspension system, which cushions the ride for occupants and cargo carried by the vehicle and stabilizes the vehicle during over-the-road operation.

A further objective of the present invention is to provide such a distributed compliance axle/suspension system which is lighter in weight than prior art axle/suspension systems, can be economically manufactured by various processes and from various materials, and which is durable in use.

Still another objective of the present invention is to provide such a distributed compliance axle/suspension system, which can be manufactured for use in various load capacity applications by adjusting the shapes and/or arrangements of the integral structure components.

These objectives and advantages are obtained by the distributed compliance axle/suspension system of the present invention, the general nature of which may be stated as including an air-ride axle/suspension system for a wheeled vehicle, including a pair of pivot bushings for pivotally mounting the system to a frame of the vehicle, pairs of shock absorbers and air springs, and a pair of axle spindle ends for mounting wheels on the system, wherein the improvement comprises, an integral structure free of any discrete substantially roll compliant component, the pivot bushings, shock absorbers, air springs, and axle spindle ends being mounted on the integral structure, whereby roll forces encountered by the axle/suspension system during vehicle operation are distributed generally throughout the integral structure to enable the system to achieve roll compliance.

BRIEF DESCRIPTION OF THE SEVERAL VIEWS OF THE DRAWINGS

The preferred embodiment of the invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DETAILED DESCRIPTION OF THE INVENTION

Figure 1:
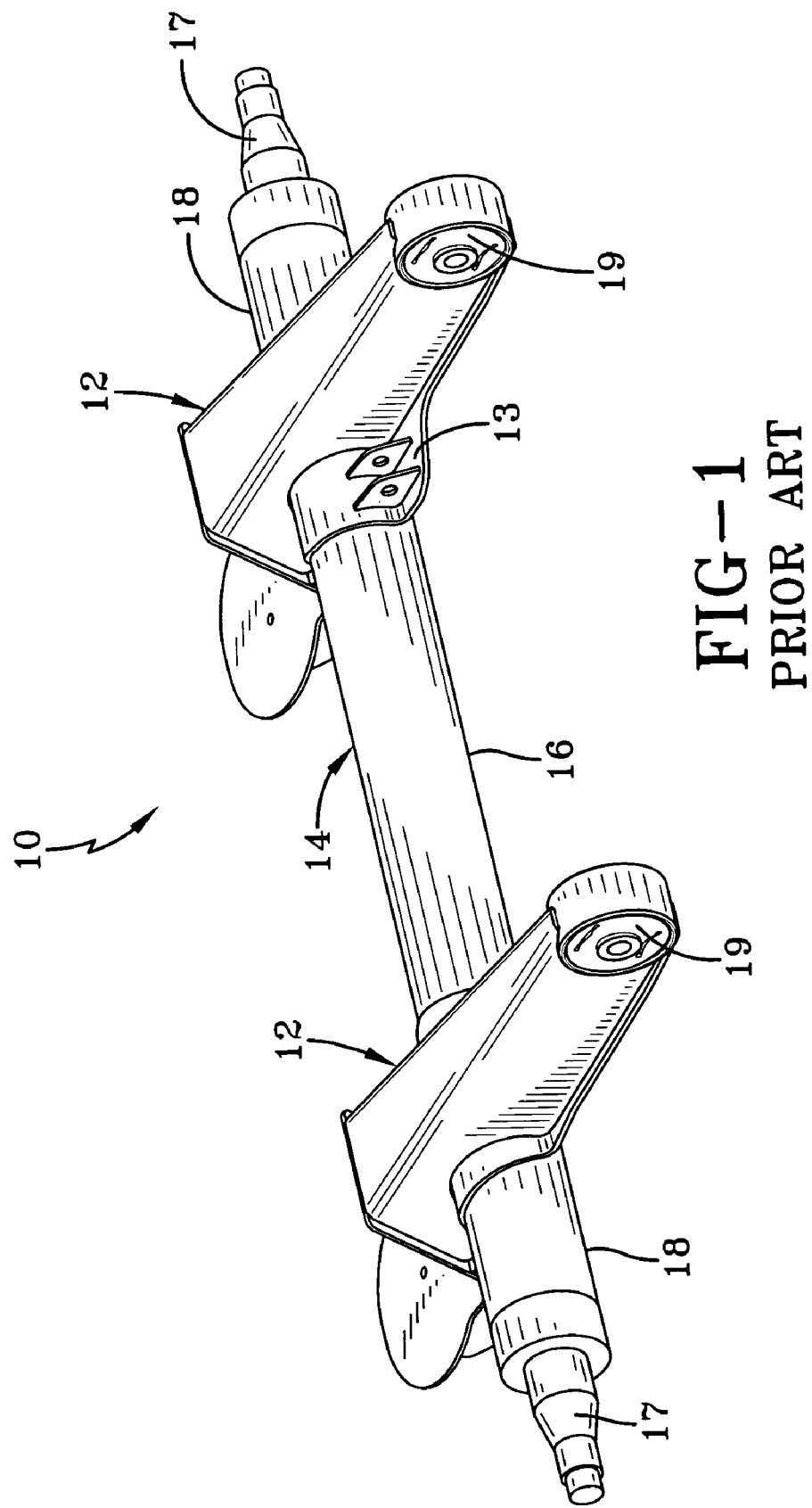
FIG. 1 is a front perspective view of the beams and axle of a prior art trailing arm air-ride axle/suspension system.

So that the present invention may be best understood, representative types of prior art axle/suspension systems now will be described. One type of prior art trailing arm air-ride axle/suspension system 10 is shown in FIG. 1, and generally includes two trailing arm beams 12 that are welded or otherwise rigidly affixed to an axle 14. Axle 14 includes a center portion 16 and a pair of ends 18 each terminating in an axle spindle 17. System 10 also typically includes air springs and shock absorbers (not shown). Normally, axle 14 acts as a very large anti-sway bar to help control rolling movements of the vehicle as it travels over-the-road. Rigid steel trailing arm beams 12 generally utilize rubber pivot bushings 19 that are softer in the vertical direction than the fore-aft horizontal direction, and are known in the art as TRI-FUNCTIONAL® bushings. Bushings 19 pivotally attach each suspension assembly to the vehicle frame via frame brackets or hangers (not shown). In system 10, the compliance is designed into TRI-FUNCTIONAL® bushings 19, so that a certain degree of roll can be maintained, while the other components of the system remain relatively rigid and non-compliant.

Figure 2:
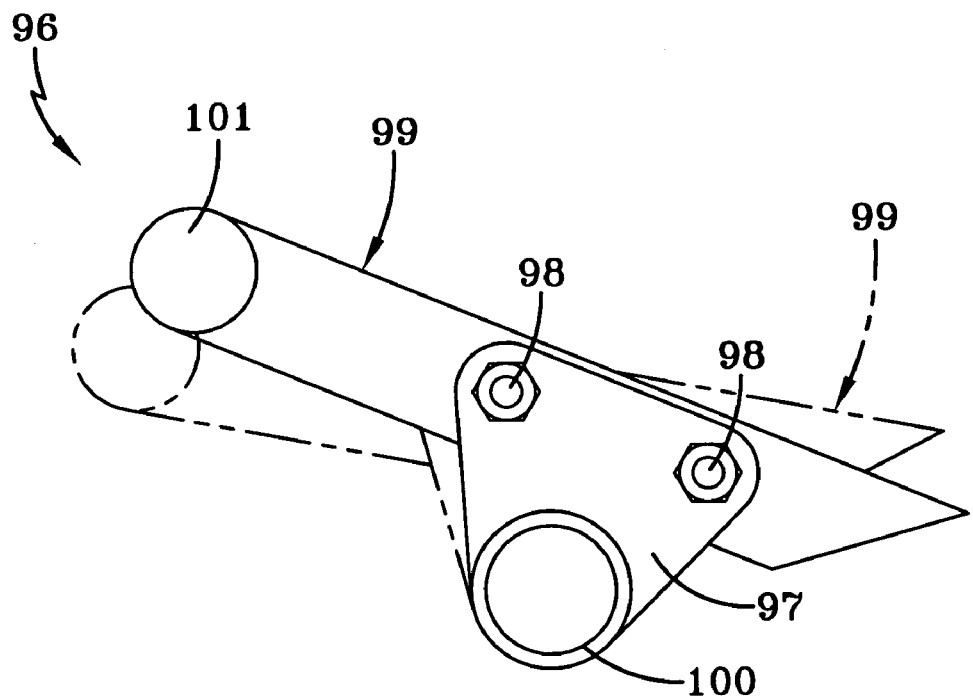
FIG. 2 is a schematic side elevational view of a prior art trailing arm air axle/suspension system of the type having a two pin axle connection and a bushing at the pivot attachment point of the beam to the vehicle frame, and further showing in phantom lines the far side beam to illustrate the compliance resulting from the bushings when roll forces are encountered during operation of the vehicle.

Other types of trailing arm air-ride axle/suspension systems use different structures to achieve the above-described roll compliance. Referring to FIG. 2, a schematic of a different structure is shown, which is known in the art as a "two pin axle connection" suspension system 96. Suspension system 96 typically includes rigid steel trailing arm beams 99 (the opposite side beam is shown in phantom lines to illustrate the roll-induced relative positions of the beams) that bolt onto respective axle seats 97 via a pair of pins 98. Axle seats 97 in turn are welded to axle 100. To achieve roll compliance in the structure, two pin axle connection suspension system 96 utilizes rubber bushings (hidden from view) in axle seat 97 about bolts 98, as well as in a pivot joint 101 that connects each trailing arm 99 to the trailer frame brackets (not shown).

Figure 3:
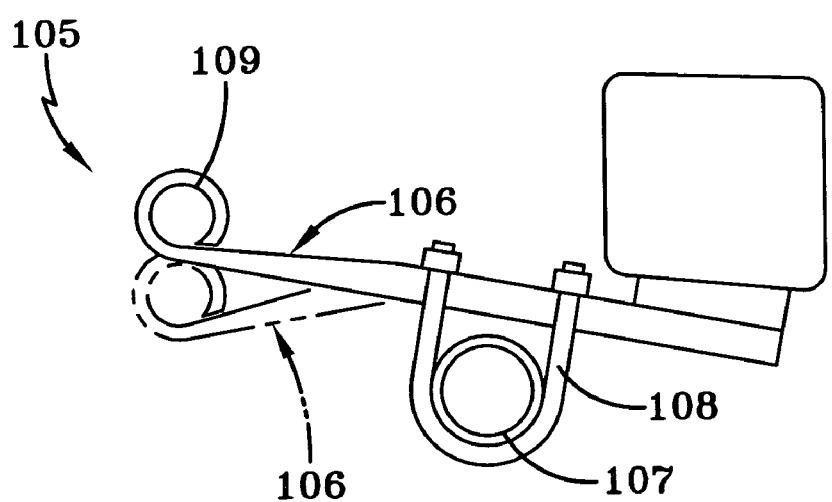
FIG. 3 is a schematic side elevational view of a prior art leaf spring beam-type trailing arm air axle/suspension system, showing in phantom lines the far side beam to illustrate the type of compliant movement that may occur in the leaf springs when roll forces are imposed on the vehicle during its operation.

Yet another type of prior art structure is a spring beam-type trailing arm air-ride axle/suspension system 105, as shown schematically in FIG. 3. Suspension system 105 typically includes trailing arms 106 (the opposite side arm is shown in phantom lines to illustrate the roll-induced relative positions of the arms) that are very stiff and thick leaf springs, which are rigidly affixed to axle 107 such as by U-bolts 108, and pivotally mounted to the vehicle frame at spring pivot end 109. Leaf springs 106 provide the roll compliance for axle/suspension system 105.

All of the above-described axle/suspension systems of the prior art involve multiple specialized components that increase manufacturing cost. In addition, the components of such prior art axle/suspension systems generally contribute to increased weight of the system, which adversely affects the fuel efficiency of the vehicle to which they are attached. Furthermore, the discrete components used to achieve roll compliance are not always optimally effective or relatively long-lived. It is understood that the structures shown and described herein for prior art axle/suspension systems 10, 96 and 105 also have application in vehicles utilizing leading arm axle/suspension systems.

As a result, a need has existed in the art to develop an axle/suspension system that overcomes the disadvantages of prior art systems and provides a light-weight, economical axle/suspension system having effective and long-lived structural components to achieve desired stability and roll compliance levels.

Figure 4:
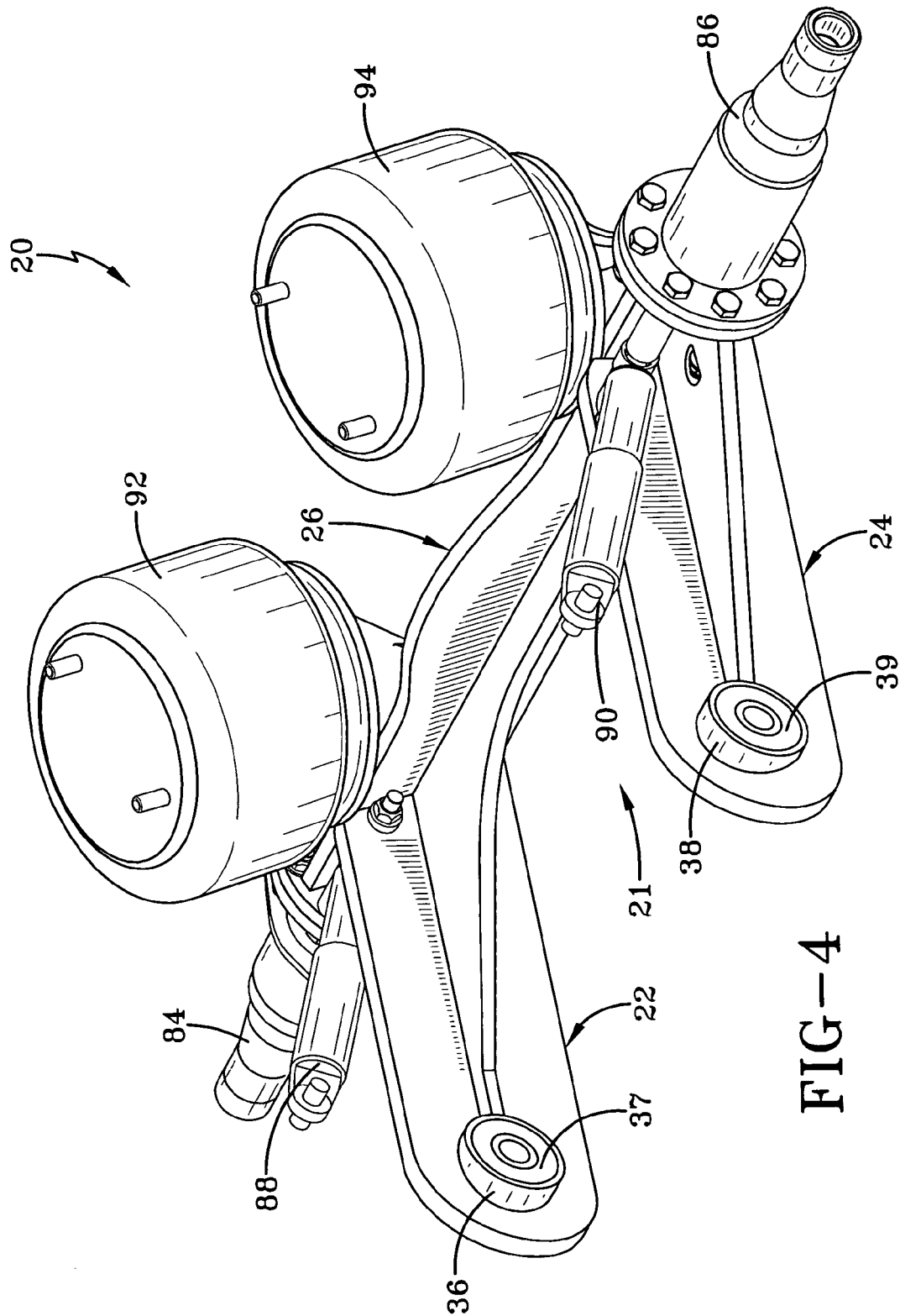
FIG. 4 is a front perspective view of the distributed compliance air-ride axle/suspension system of the present invention.
Figure 5:
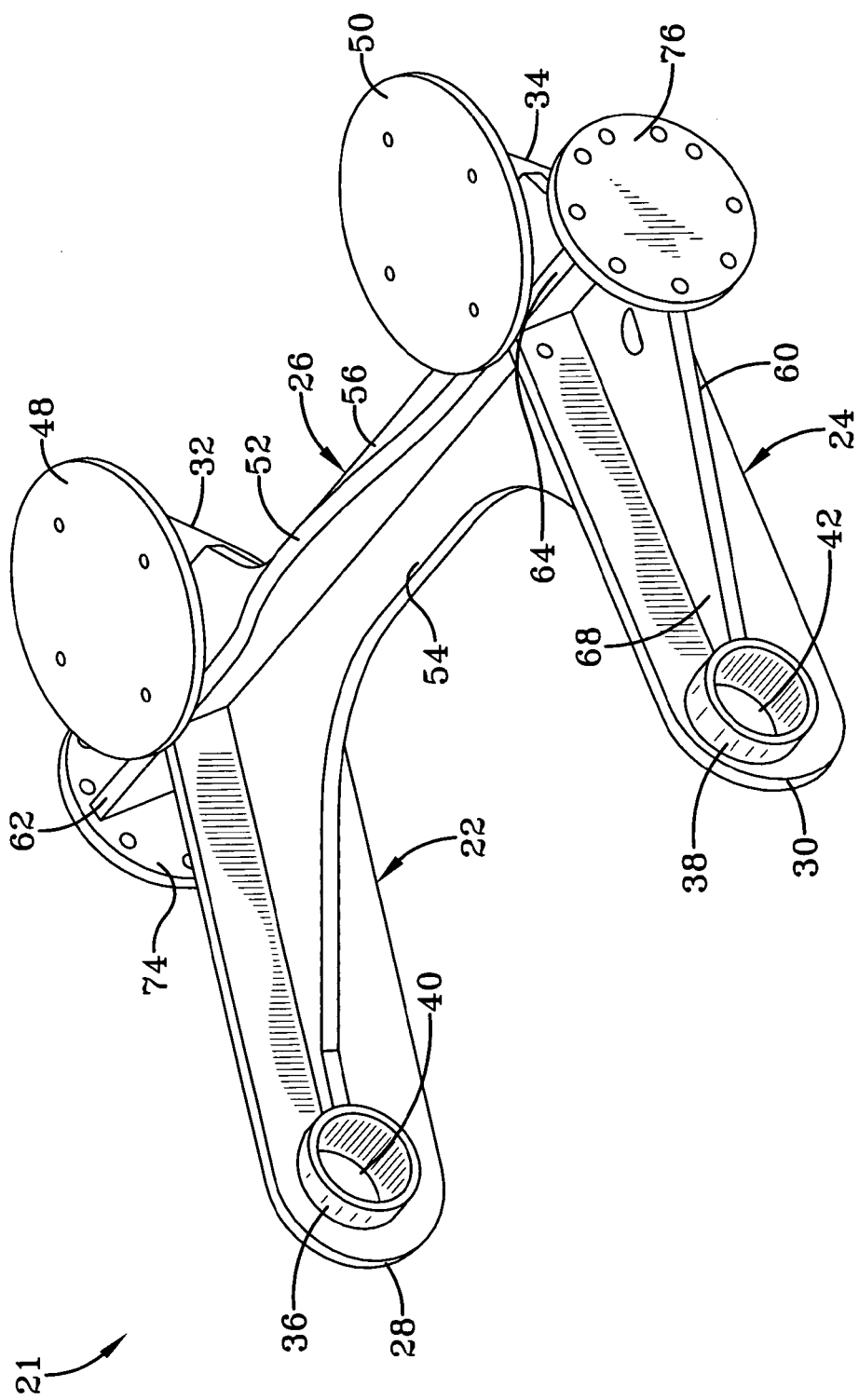
FIG. 5 is a view similar to FIG. 4, but showing only the composite plate structure which serves as the beams and axle of the system, and with the air springs, shock absorbers, bushings and axle spindle ends shown in FIG. 4 removed.
Figure 6:
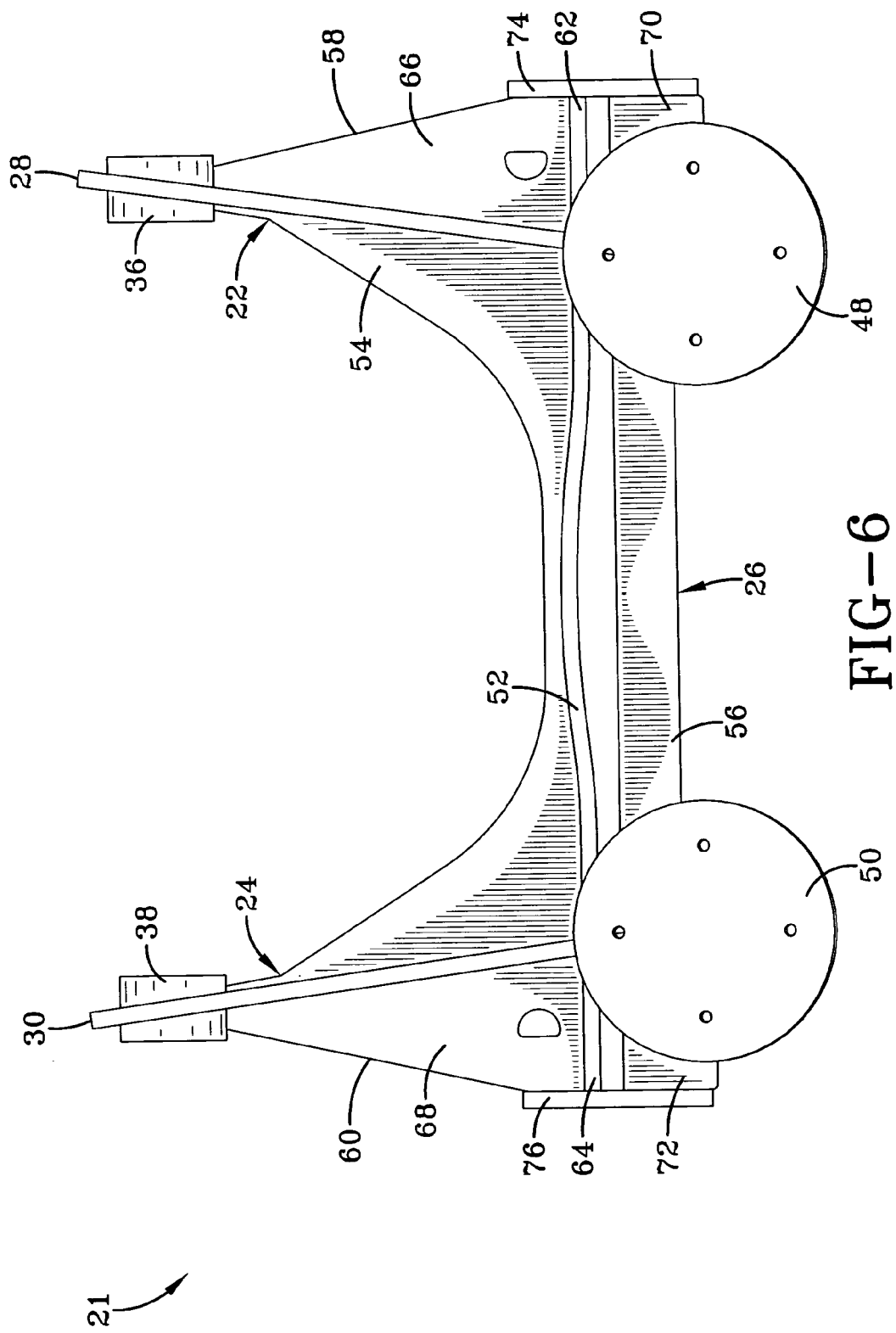
FIG. 6 is a top plan view of the structure shown in FIG. 5.
Figure 7:
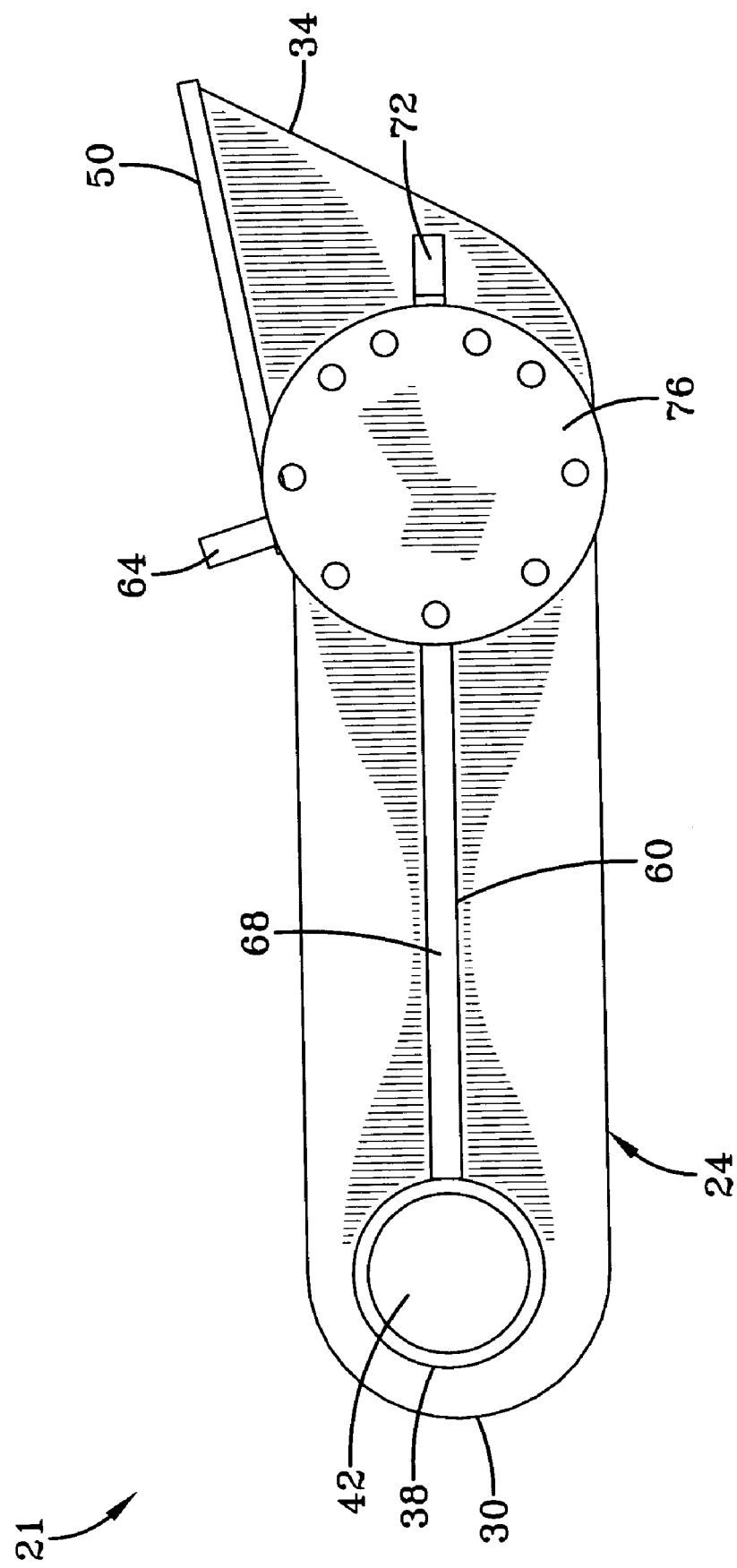
FIG. 7 is a side elevational view of the structure shown in FIGS. 5 and 6.
Figure 8:
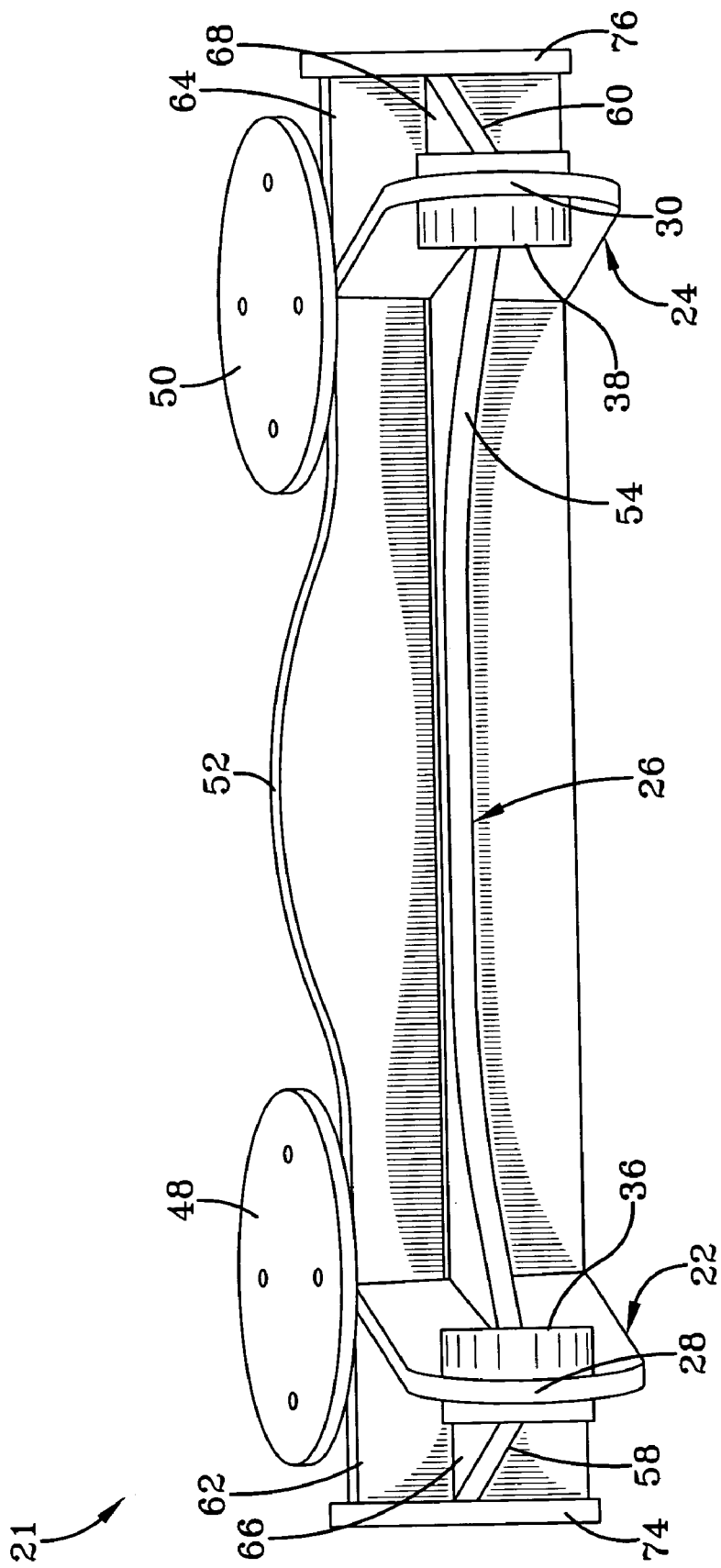
FIG. 8 is a front elevational view of the structure shown in FIGS. 5 through 7.
Figure 9:
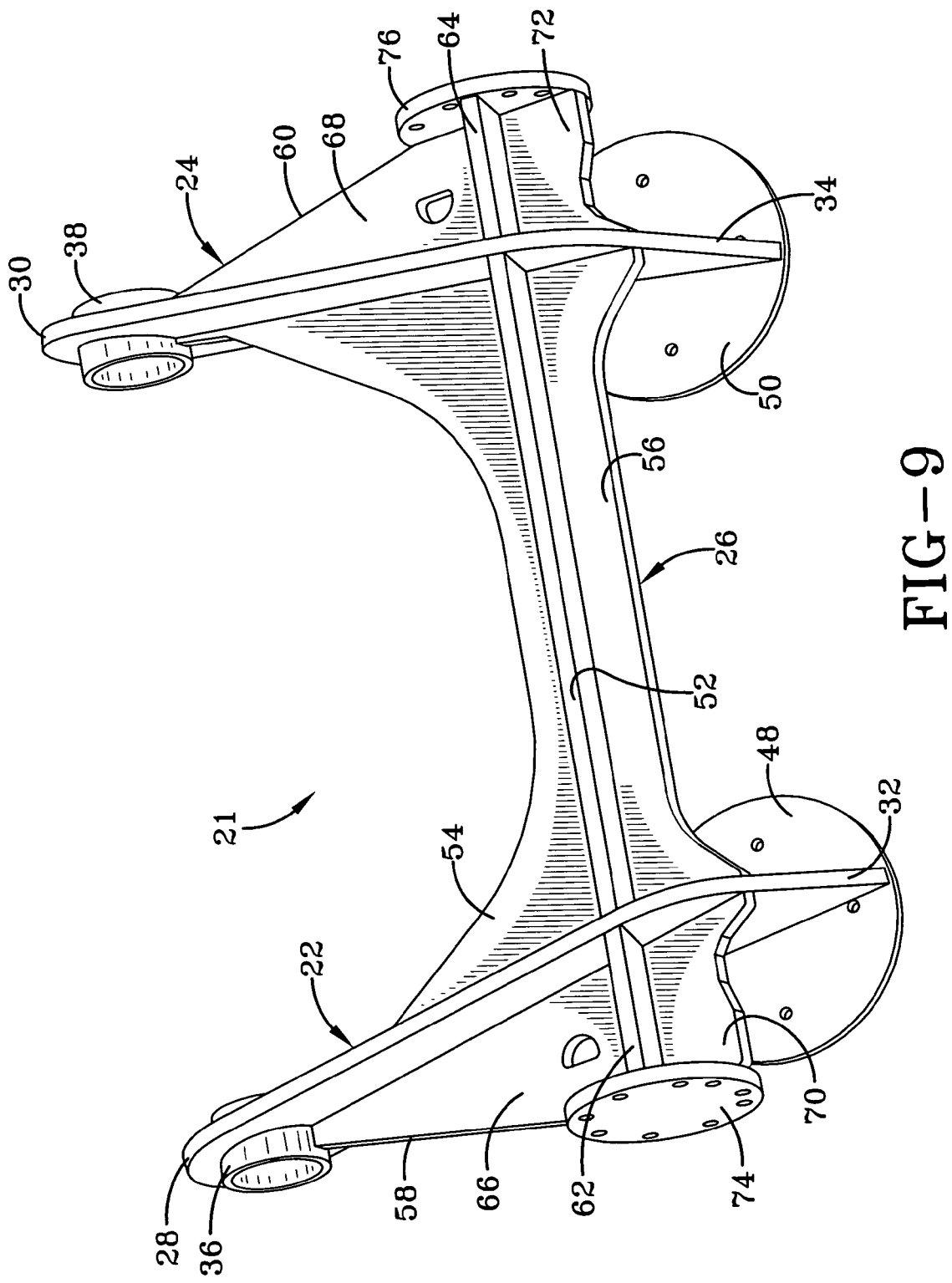
FIG. 9 is a bottom rear perspective view of the structure shown in FIGS. 5 through 8.

Turning now to FIGS. 4-12, wherein the showings are for illustrating a preferred embodiment of the invention, and not for limiting the same, FIG. 4 shows a distributed compliance axle/suspension system, indicated generally at 20, which provides an impact-dampening connection between at least a portion of a frame of a vehicle (not shown) and the vehicle wheels supported by the system. Inventive axle/suspension system 20 maintains rigidity to enable the system to function with durability and stability, yet distributes roll compliance throughout its entire structure, rather than through just one or two components, such as bushings or leaf springs, as in prior art axle/suspension systems.

Specifically, trailing arm air-ride axle/suspension system 20 of the present invention includes a composite structure 21, axle spindles 84 and 86, bushings 37 and 39, shock absorbers 88 and 90, and air springs 92 and 94. System 20 replaces prior art axle/suspension systems, such as system 10 shown in FIG. 1 (which, as noted, does not show the shock absorbers or air springs of the system).

With particular reference to FIGS. 5-9, and in accordance with one of the important features of the present invention, composite structure 21 preferably is integrally formed and includes two generally parallel, transversely spaced trailing arms 22 and 24, and a cross member 26 that extends between and connects the trailing arms and effectively functions as an axle. Trailing arms 22 and 24, cross member 26 and other components of integral structure 21, are made of plates of various shapes and sizes formed from a composite material, and bonded together as known in the art. For example, the plates may be formed of a composite material, for example, a glass fiber-reinforced thermosetting resin such as a fiberglass-reinforced thermoset polyester pultrusion, and the plates may be bonded using a known adhesive, or a process such as joining under heat and/or pressure.

Each trailing arm 22, 24 includes a front end 28, 30 and a rear end 32, 34, respectively. Disposed in front end 28, 30 of each trailing arm 22, 24 is a mounting tube 36, 38, respectively, which defines an orifice 40, 42, that facilitates pivotal connection of structure 21 to frame brackets or hangers 44, 46 (referring to FIG. 10), as will be described in greater detail hereinbelow. Affixed to rear end 32, 34 of each trailing arm 22, 24 is a respective circular air spring mounting plate 48, 50.

Cross member 26 includes a vertical portion 52 and a front horizontal portion 54 that extends from vertical portion 52 to front end 28, 30 of each trailing arm 22, 24, respectively, in a wing-like tapered fashion. Front horizontal portion 54 provides a structural connection with increased surface area between trailing arms 22, 24 and cross member 26, which allows distribution of stress. A rear horizontal portion 56 extends from vertical portion 52 to rear end 32, 34 of each trailing arm 22, 24, respectively, in a generally similar wing-like tapered manner, providing additional structural stability and distributed compliance for composite structure 21. The combination of vertical portion 52 and front and rear horizontal portions 54, 56, respectively, effectively replaces center portion 16 of axle 14 of prior art axle/suspension system 10 (referring back to FIG. 1).

Extending from an outboard surface of each trailing arm 22, 24 is a respective side member 58, 60, each of which includes a respective vertical member 62, 64. Each vertical member 62, 64 is aligned with cross member vertical portion 52. Each side member 58, 60 also includes a front horizontal member 66, 68 and a rear horizontal member 70, 72, respectively. Side members 58, 60 facilitate the mounting of respective opposing wheel flanges 74, 76 and enable attachment of axle spindle ends 84, 86 (FIG. 4).

Cross member 26 has a generally cross-sectional shape that resembles a cross. The size of the cross can be tuned or adjusted, such as by increasing or decreasing the size of vertical portion 52, front horizontal portion 54 and/or rear horizontal portion 56, to accommodate various deflection levels of vertical bending, fore-aft bending and torsional bending experienced by structure 21, and in turn, axle/suspension system 20. However, it is understood that the present invention contemplates cross-sectional shapes other than a cross, which also can be adjusted based on the particular application.

Trailing arms 22, 24 and side members 58, 60 each also include a generally cross-shaped cross section. The size of these cross sections also can be adjusted in the same manner as described above for cross member 26, to accommodate various deflection levels of vertical bending, side load bending and torsional bending. It is understood, as noted above, that the present invention contemplates adjustable cross-sectional shapes other than a cross.

Figure 10:
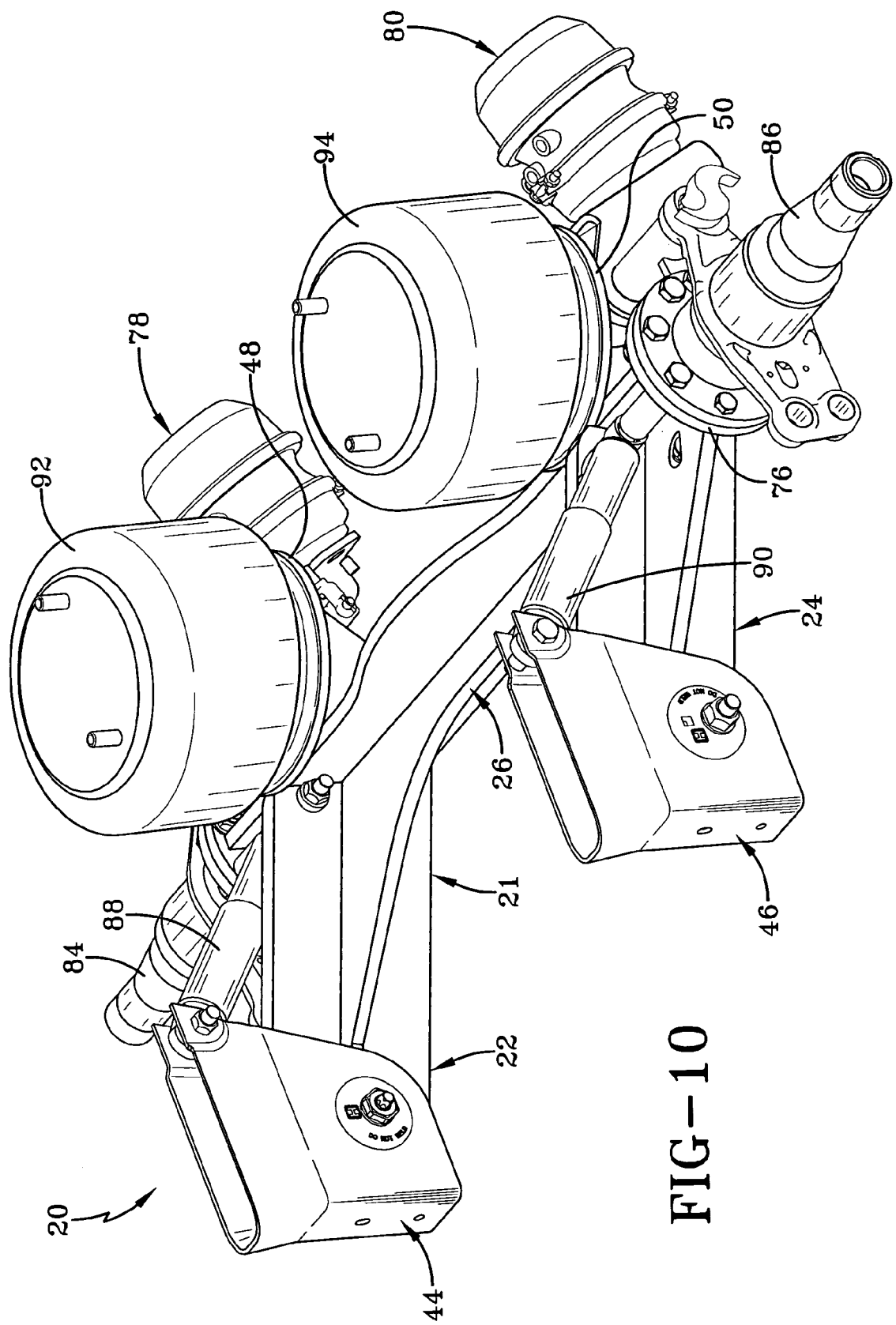
FIG. 10 is a view similar to FIG. 4, but showing the distributed compliance air-ride axle/suspension system pivotally mounted on vehicle frame hangers or brackets, and further showing brake equipment attached to the system.
Figure 11:
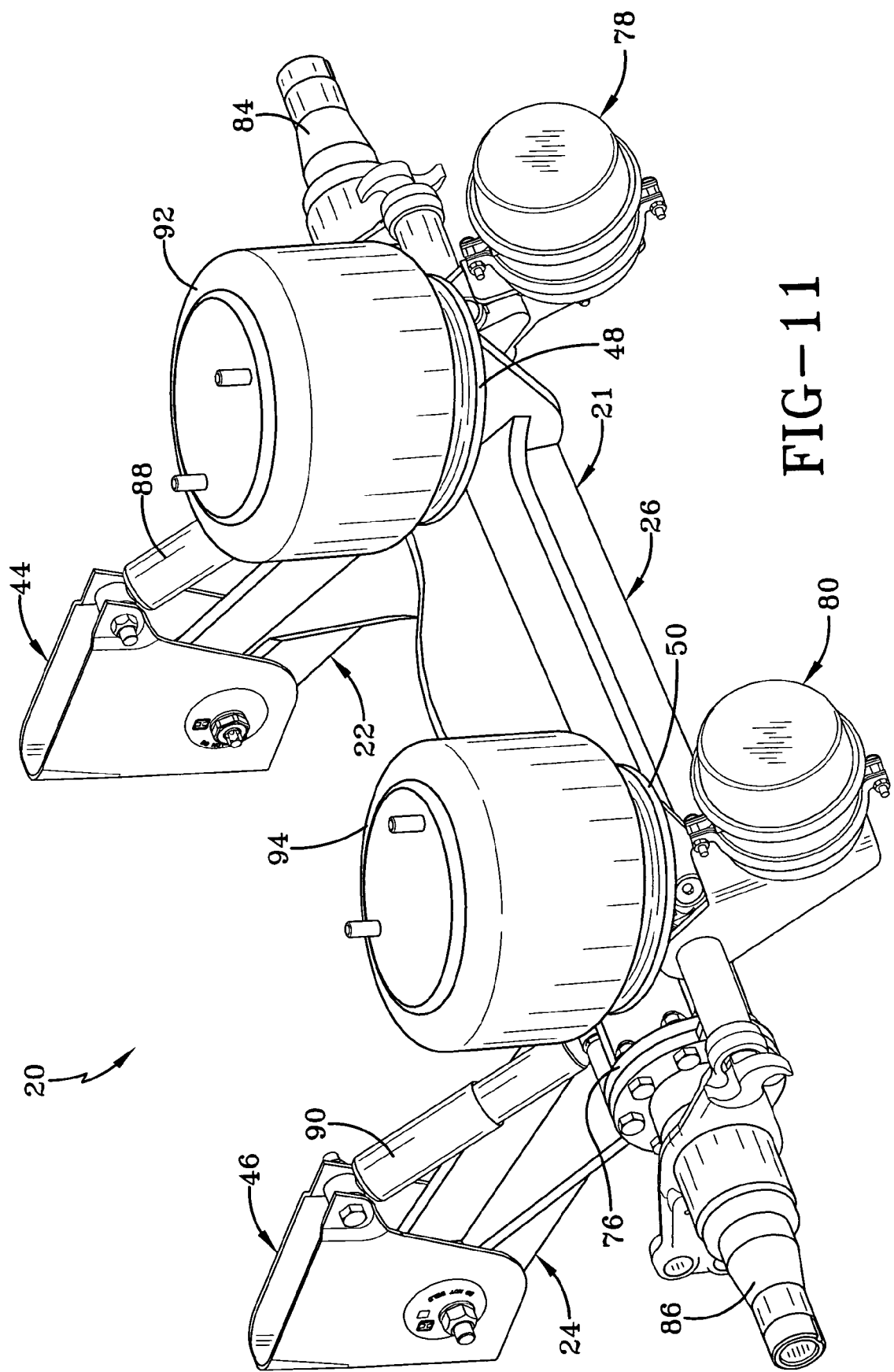
FIG. 11 is a rear perspective view of the assembly shown in FIG. 10.
Figure 12:
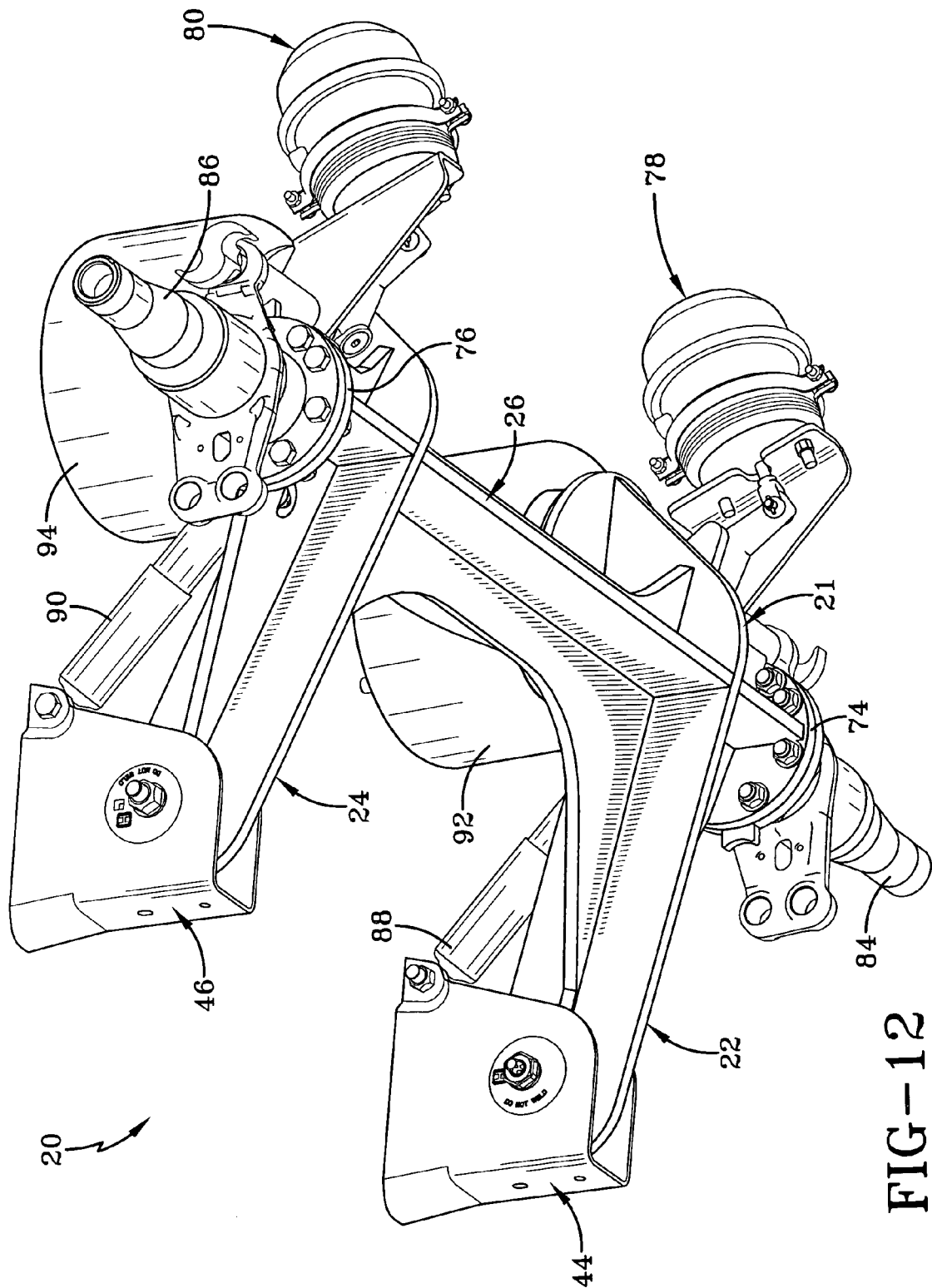
FIG. 12 is a bottom front perspective view of the assembly shown in FIGS. 10 and 11.

With additional reference to FIGS. 10-12, axle/suspension system 20 is shown in the environment in which it operates, including brake systems 78, 80 and frame hangers 44, 46. It is understood that brake systems 78, 80 can be mounted in different locations/arrangements on axle/suspension system 20, as is well-known in the art. Axle spindle ends 84, 86 bolt onto flanges 74, 76, respectively, resulting in an assembly that simplifies field maintenance procedures and accommodates desired manufacturing assembly processes. Axle spindle ends 84, 86 may be sub-assemblies that are affixed onto axle/suspension system 20 by means known in the art, such as bolting, riveting, welding, etc. When axle spindle ends 84, 86 are mass-produced as fully-assembled components, they are added at the final assembly level. This easy installation allows axle spindle ends 84, 86 to be replaced in the field if bearing problems are encountered, in contrast to prior art axle spindles 17 such as shown in prior art axle/suspension system 10 (FIG. 1), which are welded to axle ends 18. However, it is understood that axle spindle ends 84, 86 could be non-removably bonded by any suitable means to composite structure 21 if desired without affecting the overall concept of the present invention.

As mentioned above, axle/suspension system 20 includes integral structure 21, which includes composite plates. Each plate may be made of the same composite material as the others, or a variety of composite materials may be used. Accordingly, any number of processes to form the plates, as known in the art, may be employed, such as pressing, molding, extruding, pultruding, pull winding, and filament winding. In addition, all or part of axle/suspension system 20, including composite structure 21, may be made out of aluminum or steel, as design and manufacturing requirements dictate.

Various load capacity models of structure 21 can be made by changing the shape of the composite plates. Thus, it is important to note that various configurations of plates and sizes of plates are possible, as dictated by the deflection parameters of a particular application. Accordingly, the plates may take alternative arrangements and shapes, including rounded and cylindrical configurations.

In this manner, deflections experienced by integrated axle/suspension system 20 are distributed throughout composite structure 21, and thus system 20, to achieve the roll compliance dictated by the particular application. By distributing the deflection throughout system 20, the stresses resulting from the deflections also are distributed. This is in contrast to prior art axle/suspension systems, where such deflections are concentrated in TRI-FUNCTIONAL® bushings 19 (referring back to FIG. 1), in monoleaf springs 106 (referring back to FIG. 3), or in bushings of axle seat 97 (referring back to FIG. 2).

In addition, since trailing arms 22, 24 have a cross-section that is in the shape of a cross, rather than a generally rectangular box-like structure (as do trailing beams 12 of prior art axle/suspension system 10, FIG. 1), shock absorbers 88, 90 can be mounted directly to trailing arms 22, 24, respectively, rather than on an inboard-extending wing (see shock mounting wing 13 in FIG. 1), thus avoiding additional unwanted material and weight. Moreover, air springs 92, 94 are mounted on plates 48, 50, respectively, which are centered on trailing arms 22, 24. Such centering provides a more efficient structure to support air springs 92, 94. Many suspension systems of the prior art have air springs that are mounted in an offset position from the trailing arms, resulting in undesirable additional structures needed to mount the springs, and adding weight and cost to the system.

The preferred embodiment of the integral composite plate structure 21 of the present invention results in a substantial weight savings, which creates greater fuel economy for the vehicle. The weight savings of system 20 leads to longer life of associated components. Because there is less unsprung mass, components such as shock absorbers 88, 90 and brake systems 78, 80 attached to the axle/suspension system last longer. The relatively light weight of axle/suspension system 20 also reduces the cost of an associated lift kit, as known in the art.

Manufacturing time and cost also are reduced by the elimination of components associated with axle/suspension systems of the prior art. For example, a TRI-FUNCTIONAL® bushing 19 (FIG. 1) is not needed because axle/suspension system 20 distributes deflection throughout its entire structure. Instead, a simple bonded journal or shot bushing 37, 39 (FIG. 4) is mounted in its respective mounting tube 36, 38, and can be used for the pivot connection of trailing arms 22, 24, to frame hangers 44, 46. The pivot bushing costs less, weighs less and lasts longer than a TRI-FUNCTIONAL® bushing. Components attached to axle/suspension system 20, such as hangers 44, 46, also are simplified, as pivot bushing 37, 39 allows a smaller hanger size to be used, also resulting in less weight and cost.

Because portions of axle/suspension system 20 are made from a composite material, and specifically integral structure 21, paint is unnecessary for a major portion of system 20, contributing to lower manufacturing costs. Composite structure 21 eliminates corrosion problems as well, resulting in a longer life of axle/suspension system 20. Furthermore, the cost of the required manufacturing equipment and processes is greatly reduced. For example, it is possible that the current state-of-the-art friction welder used to weld spindles 17 on axle ends 18 (FIG. 1) could be eliminated, in turn eliminating the entire process surrounding the friction welder. Manufacturing problems also are reduced, as the elimination of metal parts that have to be welded together eliminates warpage of the structure that is associated with welding.

While the invention has been described in the context of trailing arm axle/suspension systems, the invention also applies to leading arm axle/suspension systems.

The present invention has been described with reference to a specific embodiment. It shall be understood that this illustration is by way of example and not by way of limitation. Potential modifications and alterations may occur to others upon a reading and understanding of this disclosure, and it is understood that the invention includes all such modifications and alterations and equivalents thereof.

Accordingly, the improved distributed compliance axle/suspension system for wheeled vehicles of the present invention is simplified, provides an effective, safe, inexpensive, and efficient system which achieves all the enumerated objectives, provides for eliminating difficulties encountered with prior art axle/suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved distributed compliance axle/suspension system is constructed, arranged and used, the characteristics of the construction and arrangement, and the advantageous, new and useful results obtained; the new and useful structures, devices, elements, arrangements, parts and combinations, are set forth in the appended claims.

What is claimed is:

1. An air-ride axle/suspension system for a wheeled vehicle, including a pair of pivot bushings for pivotally mounting said system to a frame of said vehicle, pairs of shock absorbers and air springs, and a pair of axle spindle ends for mounting wheels on the system, wherein the improvement comprises:

an integral non-hollow structure, said structure including:
a pair of arms, said arms being transversely spaced relative to said vehicle, each one of the arms extending in a longitudinal direction relative to said vehicle and including an upper surface, a lower surface, and an inboard surface extending vertically between said upper and lower surfaces; and
a cross member extending transversely between said arms and being connected to each one of the arms, said cross member including a vertically disposed portion and a horizontally disposed portion, said horizontally disposed portion being connected to said inboard surface of each one of said arms intermediate the arm upper and lower surfaces; and said pivot bushings, shock absorbers, air springs, and axle spindle ends being mounted on said integral structure, whereby roll forces encountered by said axle/suspension system during vehicle operation are distributed throughout the integral structure to enable the system to achieve roll compliance.

2. The axle/suspension system of claim 1, in which said integral structure is formed of a plurality of plates.

3. The axle/suspension system of claim 1, in which said integral structure is formed of a composite material.

4. The axle/suspension system of claim 3, in which said composite material is a fiberglass-reinforced thermosetting resin.

5. The axle/suspension system of claim 4, in which said thermosetting resin is polyester.

6. The axle/suspension system of claim 2, in which said plurality of plates have varying sizes and configurations.

7. The axle/suspension system of claim 1, in which said vehicle is a heavy-duty vehicle selected from the group consisting of semi-trailers and dump trucks.

8. The axle/suspension system of claim 1, in which said cross member has a cross-shaped cross-sectional configuration.

9. The axle/suspension system of claim 1, in which each one of said arms includes an outboard surface; in which said integral structure includes a pair of side members; in which each one of said side members includes a vertically disposed portion; and in which each one of said vertically disposed portions of said side members is connected to said outboard surface of a respective one of the arms.

10. The axle/suspension system of claim 9, in which each one of said side members includes a horizontally disposed portion connected to said side member vertically disposed portion and to said outboard surface of a respective one of said arms.

11. The axle/suspension system of claim 10, in which each one of said side members is aligned with said cross member.

12. The axle/suspension system of claim 10, in which each one of said side members has a cross-shaped cross-sectional configuration.

13. The axle/suspension system of claim 10, in which said horizontally disposed portion of said side member is connected to a front surface of said side member vertically disposed portion.

14. The axle/suspension system of claim 10, in which said horizontally disposed portion of said side member is connected to a rear surface of said side member vertically disposed portion.

15. The axle/suspension system of claim 10, in which said horizontally disposed portion of said side member extends substantially along a longitudinal length of the respective arm to which the horizontally disposed portion is connected.

16. The axle/suspension system of claim 10, in which said integral structure includes a pair of wheel flanges; in which each one of said wheel flanges is connected to a respective one of said side members; and in which each one of a pair of axle spindle ends is connected to a respective one of said wheel flanges.

17. The axle/suspension system of claim 1, in which said integral structure includes a pair of air spring mounting plates; and in which each one of said pair of air spring mounting plates is connected to said upper surface of a respective one of said arms.

18. The axle/suspension system of claim 1, in which said horizontally disposed portion of said cross member is connected to a front surface of said vertically disposed portion.

19. The axle/suspension system of claim 1, in which said horizontally disposed portion of said cross member is connected to a rear surface of said vertically disposed portion.

20. The axle/suspension system of claim 1, in which said horizontally disposed portion of said cross member extends substantially along a longitudinal length of each one of said arms.

21. The axle/suspension system of claim 1, in which said horizontally disposed portion of said cross member is connected to said inboard surface of each one of said arms centrally between said arm upper and lower surfaces.

22. An air-ride axle/suspension system for a wheeled vehicle, including a pair of pivot bushings for pivotally mounting said system to a frame of said vehicle, pairs of shock absorbers and air springs, and a pair of axle spindle ends for mounting wheels on the system, wherein the improvement comprises:
   an integral structure, said structure including:
      a pair of arms, said arms being transversely spaced relative to said vehicle, each one of the arms extending in a longitudinal direction relative to said vehicle and including an upper surface, a lower surface, and inboard and outboard surfaces each extending vertically between said upper and lower surfaces;
      a cross member extending transversely between said arms and being connected to each one of the arms, said cross member including a vertically disposed portion and a horizontally disposed portion, said horizontally disposed portion being connected to said inboard surface of each one of said arms intermediate the arm upper and lower surfaces; and
   a pair of side members, each one of said side members including a vertically disposed portion connected to said outboard surface of a respective one of said arms, and a horizontally disposed portion connected to said side member vertically disposed portion and to the outboard surface of a respective one of the arms; and
   said pivot bushings, shock absorbers, air springs, and axle spindle ends being mounted on said integral structure, whereby roll forces encountered by said axle/suspension system during vehicle operation are distributed throughout the integral structure to enable the system to achieve roll compliance.

23. An air-ride axle/suspension system for a wheeled vehicle, including a pair of pivot bushings for pivotally mounting said system to a frame of said vehicle, pairs of shock absorbers and air springs, and a pair of axle spindle ends for mounting wheels on the system, wherein the improvement comprises:
   an integral non-hollow structure, said structure including:
      a pair of arm plates, said arm plates being transversely spaced relative to said vehicle, each one of the arm plates extending in a longitudinal direction relative to said vehicle and including an upper surface, a lower surface, and an inboard surface extending vertically between said upper and lower surfaces; and
      a cross member extending transversely between said arm plates and being connected to each one of the arm plates, said cross member including a vertically disposed plate and a horizontally disposed plate, said horizontally disposed plate being connected to said inboard surface of each one of said arm plates intermediate the arm plate upper and lower surfaces; and
   said pivot bushings, shock absorbers, air springs, and axle spindle ends being mounted on said integral structure, whereby roll forces encountered by said axle/suspension system during vehicle operation are distributed throughout the integral structure to enable the system to achieve roll compliance.

24. An air-ride axle/suspension system for a wheeled vehicle, including a pair of pivot bushings for pivotally mounting said system to a frame of said vehicle, pairs of shock absorbers and air springs, and a pair of axle spindle ends for mounting wheels on the system, wherein the improvement comprises:
   an integral structure, said structure including:
      a pair of arms, said arms being transversely spaced relative to said vehicle, each one of the arms extending in a longitudinal direction relative to said vehicle and including an upper surface, a lower surface, and an inboard surface extending vertically between said upper and lower surfaces; and
      a cross member having a cross-shaped cross-sectional configuration and extending transversely between said arms and being connected to each one of the arms, said cross member including a vertically disposed portion and a horizontally disposed portion, said horizontally disposed portion being connected to said inboard surface of each one of said arms intermediate the arm upper and lower surfaces; and
   said pivot bushings, shock absorbers, air springs, and axle spindle ends being mounted on said integral structure, whereby roll forces encountered by said axle/suspension system during vehicle operation are distributed throughout the integral structure to enable the system to achieve roll compliance.

25. An air-ride axle/suspension system for a wheeled vehicle, including a pair of pivot bushings for pivotally mounting said system to a frame of said vehicle, pairs of shock absorbers and air springs, and a pair of axle spindle ends for mounting wheels on the system, wherein the improvement comprises:
   an integral structure, said structure including:
      a pair of arms, said arms being transversely spaced relative to said vehicle, each one of the arms extending in a longitudinal direction relative to said vehicle and including an upper surface, a lower surface, an inboard surface, and an outboard surface, wherein each of said inboard and outboard surfaces extends vertically between said upper and lower surfaces;
      a cross member extending transversely between said arms and being connected to each one of the arms, said cross member including a vertically disposed portion and a horizontally disposed portion, said horizontally disposed portion being connected to said inboard surface of each one of said arms intermediate the arm upper and lower surfaces; and a pair of side members, each one of said side members including a vertically disposed portion and a horizontally disposed portion, said vertically disposed portion being connected to said outboard surface of a respective one of said arms, and said horizontally disposed portion being connected to the side member vertically disposed portion and to the arm outboard surface; and said pivot bushings, shock absorbers, air springs, and axle spindle ends being mounted on said integral structure, whereby roll forces encountered by said axle/suspension system during vehicle operation are distributed throughout the integral structure to enable the system to achieve roll compliance.

26. The axle/suspension system of claim 25, in which each one of said side members is aligned with said cross member.

27. The axle/suspension system of claim 25, in which each one of said side members has a cross-shaped cross-sectional configuration.

28. The axle/suspension system of claim 25, in which said horizontally disposed portion of said side member is connected to a front surface of said side member vertically disposed portion.

29. The axle/suspension system of claim 25, in which said horizontally disposed portion of said side member is connected to a rear surface of said side member vertically disposed portion.

30. The axle/suspension system of claim 25, in which said horizontally disposed portion of said side member extends substantially along a longitudinal length of the respective arm to which the horizontally disposed portion is connected.

31. The axle/suspension system of claim 25, in which said integral structure includes a pair of wheel flanges; in which each one of said wheel flanges is connected to a respective one of said side members; and in which each one of a pair of axle spindle ends is connected to a respective one of said wheel flanges.

* * * * *